(12) United States Patent
Hoskisson et al.

(10) Patent No.: US 8,196,599 B2
(45) Date of Patent: *Jun. 12, 2012

(54) SADDLE TEE

(75) Inventors: Scot Hoskisson, Layton, UT (US); Tres Wangsgaard, Holladay, UT (US); Alan T. Ence, Syracuse, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/943,764

(22) Filed: Nov. 10, 2010

(65) Prior Publication Data

US 2011/0127764 A1 Jun. 2, 2011

Related U.S. Application Data

(63) Continuation of application No. 11/952,620, filed on Dec. 7, 2007, now Pat. No. 7,832,420.

(51) Int. Cl.
*F16L 41/04* (2006.01)
*F16L 41/14* (2006.01)
(52) U.S. Cl. ........................ 137/318; 285/197
(58) Field of Classification Search .................. 137/318, 137/317; 285/197; 248/71, 74.1, 74.3, 74.4; 24/487
See application file for complete search history.

(56) References Cited

U.S. PATENT DOCUMENTS

| | | |
|---|---|---|
| 1,928,316 A | 9/1933 | Muto |
| 2,344,163 A | 3/1944 | Misch |
| 2,839,075 A | 6/1958 | Mueller |
| 3,132,881 A | 5/1964 | Corey |
| 3,162,211 A | 12/1964 | Barusch |
| 3,258,822 A | 7/1966 | Schlesch et al. |
| 3,280,846 A | 10/1966 | Anderson et al. |
| 3,343,724 A | 9/1967 | Malpas |
| 3,432,188 A | 3/1969 | Turner |
| 3,460,715 A | 8/1969 | Lane et al. |
| 3,460,721 A | 8/1969 | Hamel et al. |
| 3,471,176 A | 10/1969 | Gilchrist |
| 3,489,441 A | 1/1970 | Malcolm |
| 3,756,261 A | 9/1973 | Minchhoff |
| 3,891,150 A | 6/1975 | Hoff et al. |
| 3,920,037 A | 11/1975 | Hoff et al. |
| 3,957,082 A | 5/1976 | Fuson et al. |
| 3,973,732 A | 8/1976 | Diggs |
| 3,999,785 A | 12/1976 | Blakeley |
| 4,076,038 A | 2/1978 | Wynne |
| 4,140,155 A | 2/1979 | Tannery |
| 4,158,461 A | 6/1979 | Francis |
| 4,239,265 A | 12/1980 | King, Sr. |
| 4,258,742 A | 3/1981 | Louthan et al. |

(Continued)

*Primary Examiner* — Kevin Lee
(74) *Attorney, Agent, or Firm* — Madson IP, P.C.

(57) ABSTRACT

An improved saddle tee for branching a conduit from a main line is disclosed. The saddle tee includes a base unit that defines an opening for receiving a tap and interlocking jaws for securing the base unit to a main line. The tap may include a shaped portion for receiving a tool interface to rotate the tap to drive the tap into the main line. The tool interface could be secured to a power tool to enable rapid driving of the saddle tee into the main line. The saddle tee may also include offset arcuate interlocking jaws to enable the jaws to interlock around the main line with ease. Optional interface surfaces on the tap and base unit enable the tap and base unit to interlock to limit rotation of the tap relative to the base unit when the tap is fully inserted into the base unit.

20 Claims, 7 Drawing Sheets

U.S. PATENT DOCUMENTS

| | | | |
|---|---|---|---|
| 4,291,855 A | 9/1981 | Schenkel et al. | |
| 4,294,470 A | 10/1981 | Tucker | |
| 4,373,235 A | 2/1983 | Korgaonkar | |
| 4,391,458 A | 7/1983 | Blakeley | |
| D289,009 S | 3/1987 | Salacuse | |
| 4,714,218 A | 12/1987 | Hungerford, Jr. | |
| 4,730,636 A | 3/1988 | Volgstadt et al. | |
| 4,789,189 A | 12/1988 | Robertson | |
| 4,982,920 A | 1/1991 | Hungerford, Jr. | |
| 5,020,832 A | 6/1991 | Coblentz | |
| 5,024,405 A | 6/1991 | McGuire | |
| 5,079,802 A | 1/1992 | Blase et al. | |
| 5,095,564 A | 3/1992 | Kruger | |
| 5,105,844 A | 4/1992 | King, Sr. | |
| 5,169,177 A | 12/1992 | McLennan et al. | |
| 5,230,496 A | 7/1993 | Shillington et al. | |
| 5,251,857 A | 10/1993 | Grice et al. | |
| 5,277,387 A | 1/1994 | Lewis et al. | |
| 5,483,990 A | 1/1996 | Martin | |
| 5,490,651 A | 2/1996 | Kump | |
| 5,590,859 A | 1/1997 | Lord | |
| 5,640,991 A | 6/1997 | King | |
| 5,694,972 A | 12/1997 | King | |
| 5,697,585 A | 12/1997 | Hungerford, Jr. | |
| 5,732,732 A * | 3/1998 | Gross et al. | 137/318 |
| 5,794,896 A | 8/1998 | Hungerford, Jr. | |
| 5,964,241 A | 10/1999 | King | |
| 6,216,723 B1 | 4/2001 | King | |
| 6,357,472 B1 | 3/2002 | King | |
| 6,510,865 B2 | 1/2003 | King, Jr. et al. | |
| 6,681,796 B2 | 1/2004 | King, Jr. | |
| 6,767,033 B2 | 7/2004 | King, Jr. et al. | |
| 6,773,036 B1 | 8/2004 | King | |
| 6,834,892 B2 * | 12/2004 | Kornau et al. | 285/364 |
| 6,935,599 B2 | 8/2005 | van Walraven | |
| 6,978,973 B1 | 12/2005 | Gretz | |
| 6,986,532 B1 | 1/2006 | King | |
| 7,021,672 B2 | 4/2006 | Ericksen et al. | |
| 7,150,476 B2 | 12/2006 | King | |
| 7,219,684 B2 | 5/2007 | Dabir et al. | |

* cited by examiner

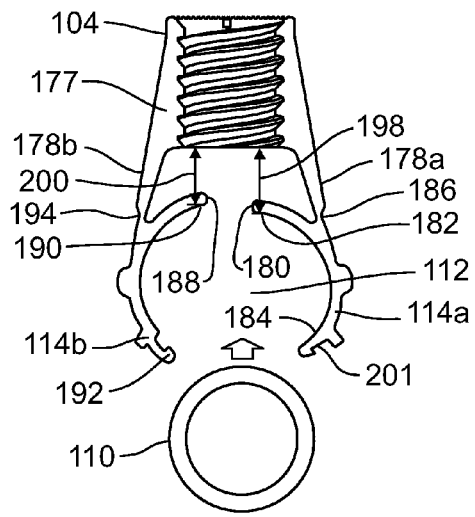
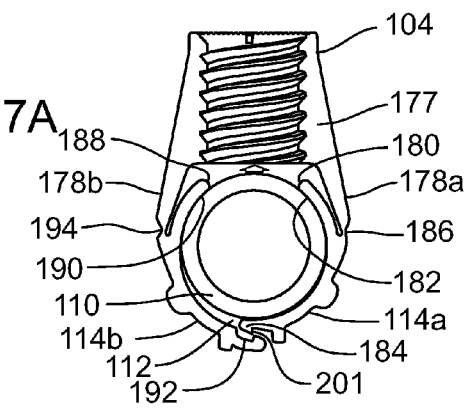
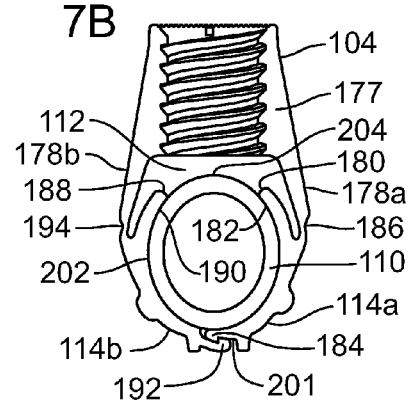

SADDLE TEE

This application is a continuation of U.S. patent application Ser. No. 11/952,620, filed Dec. 7, 2007 and issued as U.S. Pat. No. 7,832,420, which is incorporated herein by reference.

BACKGROUND OF THE INVENTION

A saddle tee is a device that is used to branch a conduit off of a main line. In other words, a saddle tee enables a secondary line to be connected to a main line. A conventional saddle tee includes a main unit that is placed around the main line and a piercing mechanism that is driven into the main line surrounded by the main unit.

Unfortunately, conventional saddle tees suffer from a number of disadvantages. For example, driving the piercing mechanism into the main line can be time consuming and tiring. Further, securing the main unit around the main line can be time consuming and often requires a user to clear a significant amount of space around the main line in order to properly access the main line. Also, when fluid pressure enters the piercing mechanism, the piercing mechanism can become loose, potentially creating leaks or even dislodging the piercing mechanism from the main line.

Accordingly, an improved saddle tee that resolves one or more of the limitations discussed above is desirable. The saddle tee disclosed herein resolves one or more of these concerns.

BRIEF SUMMARY OF THE INVENTION

The disclosed saddle tee includes a base unit having a body defining an opening for receiving a tap to pierce a main line. The base unit also includes interlocking arcuate jaws for securing the base unit to a main line.

The tap defines a passageway and includes a tapered end. The tapered end includes an aperture in fluid communication with the passageway. The tap may also include a shaped portion for receiving a tool interface. The tool interface also interfaces with a power tool, such as a drill or an impact driver. Rotation of the power tool is translated through the tool interface to the tap, enabling the tap to be rapidly driven into the main line.

The shaped portion of the tap comprises a throat defining a portion of the passageway. Alternatively, the shaped portion may be a shaped protrusion on a first end of the tap, which is generally opposite the tapered end of the tap. In the case of a shaped protrusion, the tool interface could be a socket and an adapter for translating rotation of a power driver, or other power tool or a ratchet wrench, to rotate of the socket. The shaped portion of the tap may be embodied in a number of different ways and may comprise, for example, a shape for receiving a hexagonal or Allen wrench type tool interface.

One embodiment of the disclosed saddle tee includes mating interface surfaces. A first interface surface on the base unit has a series of linearly aligned ridges. A second interface surface on a shoulder of a tap mates with the first interface to limit rotation of the tap relative to the base unit when the tap is fully inserted into the base unit. When the first interface is aligned and seated on the second interface, a threshold level of torque is required to rotate the tap relative to the base unit. The threshold level of torque, in one embodiment, is in excess of that which is likely to be reached without human intervention. In one embodiment, when the second interface surface is aligned and seated on the first interface surface, opposing apertures in the tapered of the tap are aligned to flow within the main line to facilitate fluid flow through the tap.

In one embodiment of the saddle tee, the base unit includes a first and a second arcuate interlocking jaw. A first arcuate interlocking jaw includes a first contact end, a first contact surface proximate the first contact end, a first interlocking end, and a first pivot disposed between the first contact end and the first interlocking end. The base unit further includes a second arcuate interlocking jaw that includes a second contact end, a second contact surface proximate the second contact end, a second interlocking end, and a second pivot disposed between the second contact end and the second interlocking end. When the first and second interlocking jaws are positioned around the main line, the first and second interlocking ends properly interlock if the first interlocking end is positioned closer to the main line than the second interlocking end.

In an open state, the first and second arcuate interlocking jaws define a receiving cavity for receiving the main line. The first contact surface is positioned more remote from the body of the base unit than the second contact surface, i.e., the first contact surface is offset from the second contact surface. This enables the first arcuate interlocking jaw to contact the main line first as the main line is positioned into the receiving cavity. As a result, the first interlocking arcuate jaw rotates and positions about the main line first. Thereafter, a second arcuate interlocking jaw is positioned about the main line.

This sequence of events, resulting from the offset position of the first and second contact surfaces facilitates securing the arcuate interlocking jaws around the main line because the first interlocking end will position about on the main line first followed by the second interlocking end. The sequential positioning of the interlocking ends enables the interlocking ends to properly mate, securing the arcuate interlocking jaws around the main line without the need to manually adjust or interlock the interlocking ends. If the second interlocking jaw positioned about the main line first, the interlocking ends will not properly mate, requiring the user to manually align or interlock the interlocking ends. Thus, the design of the offset contact surfaces significantly facilitates installation of the base unit onto the main line.

In one embodiment, the tap includes a fitting with a gripping mechanism that grasps an end of a conduit with a smooth outer surface—without annular grooves, annular flanges, or annular beads—to secure the conduit within the fitting. Further, the tap and base unit may include raised text indicating the size of pipe with which the tap or base unit is capable of interfacing. With respect to the tap, the raised text may further comprise a reinforcing rib to strengthen the tap.

BRIEF DESCRIPTION OF THE SEVERAL VIEWS OF THE DRAWINGS

In order that the manner in which the above-recited and other features and advantages of the invention are readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 7A-C are sectional views of the base unit that illustrate arcuate interlocking jaws for securing the base unit to a main line in an open, intermediate, and a locked or closed state.

DETAILED DESCRIPTION OF THE INVENTION

The presently preferred embodiments of the invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1 through 8, is not intended to limit the scope of the invention, as claimed, but is merely representative of presently preferred embodiments of the invention.

As used herein, the term "in fluid communication with" means that fluid, if present, could pass from a first identified fluid passageway, object, opening, or aperture to a second fluid passageway, object, opening, or aperture. This term does not require that fluid be actually present within any of the identified fluid passageways, objects, openings, or apertures.

Figure 1:
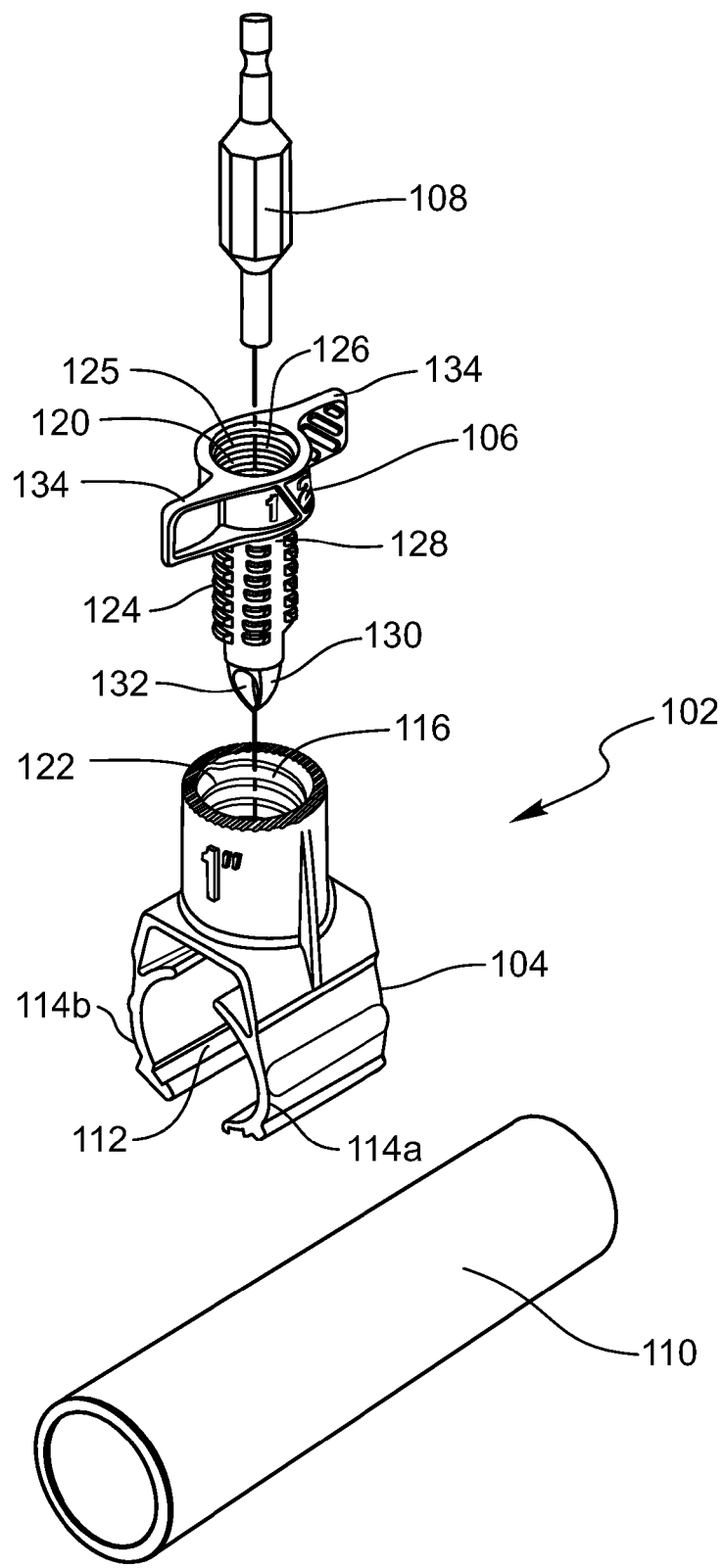
FIG. 1 is an exploded, perspective view of one embodiment of saddle tee including a base unit and a tap having a threaded fitting, shown together with a tool interface and a main line.

FIG. 1 is an exploded, perspective view of a saddle tee 102, including a base unit 104 and a tap 106, shown with a tool interface 108 and a main line 110. The saddle tee 102 is utilized to branch a conduit from a main line 110 or, in other words, to create a conduit from a main line 110. As used in this application, a conduit could be a pipe, fitting, sprinkler, sprinkler drain, or any other type of device or product that could be secured to a pipe or utilized in a sprinkling system.

In overview, the base unit 104 is attached to the main line 110 by positioning the main line 110 within a receiving cavity 112 defined by a pair of arcuate interlocking jaws 114a-b of the base unit 104. The tap 106 is inserted into an opening 116 in the base unit 104. A tool interface 108 is inserted into or onto a shaped portion (shown, e.g., in FIG. 4A or 4B) of the tap 106. A power tool (not shown) may be used to rotate the tool interface 108 thereby causing the tap 106 to rotate and driving it into the main line 110.

As indicated above, the base unit 104 includes an opening 116 for receiving the tap 106. The base unit 104 also includes arcuate interlocking jaws 114a-b for securing the base unit 104 to the main line 110. The opening 116 of the base unit 104 includes internal threads 122 for interfacing with external threads 124 on the tap 106. In an alternative embodiment (not shown), the tap 106 could include a cup-shaped cap with inward facing threads that mate with outward facing threads on an outer surface of the base unit 104. Those skilled in the art will appreciate that the base unit 104 may be made from a number of different materials, such as a polymer, a plastic, a metal, a combination thereof, or any other suitable material.

The tap 106 defines a passageway 126 and also includes a first end 128 and a second, or tapered, end 130. The second, or tapered, end 130 includes at least one aperture 132 in fluid communication with the passageway 126. The tap 106 may include one or more apertures 132. In one embodiment, the apertures 132 are disposed on opposing sides of the second, or tapered, end 130 of the tap 106 to allow fluid to more freely flow through the main line 110 and through the tap 106 when the tap 106 is properly oriented within the base unit 104.

The tap 106 may optionally include wings 134 that make it easier to hold the tap 106 and also allow for manual rotation of the tap 106. The tap 106, like the base unit 104, may be made from a number of different materials, such as a polymer, a plastic, a metal, a combination thereof, or any other suitable material.

The tap 106 also includes external threads 124 for mating with the base unit 104. The external threads 124 may be embodied, for example, as a series of protrusions, as shown in FIG. 1, or may be embodied as a continuous thread.

The tap 106 may also include a shaped portion (shown, e.g., in FIGS. 4A and 4B) for receiving a tool interface 108. As will be explained in greater detail in connection with FIGS. 4A and 4B, the tool interface 108 may interface with the shaped portion (shown in FIGS. 4A and 4B) of the tap 106. The tool interface 108 is shaped not only to interface with the tap 106, but also to interface with a power tool (not shown) or an adaptor for a power tool. The power tool may comprise a driver, impact driver, power drill, or any other power tool that can cause the tool interface 108 to rotate, and hence, can cause the tap 106 to rotate. The tool interface 108 could be made from a metal material, such as an alloy or other suitable material.

FIG. 1 also illustrates a fitting 120 for securing a conduit (not shown) to the tap 106. The illustrated fitting 120 includes internal threads 125 defined by the tap 106. The fitting 120 is opposite the tapered end 103 of the tap 106.

Figure 2:
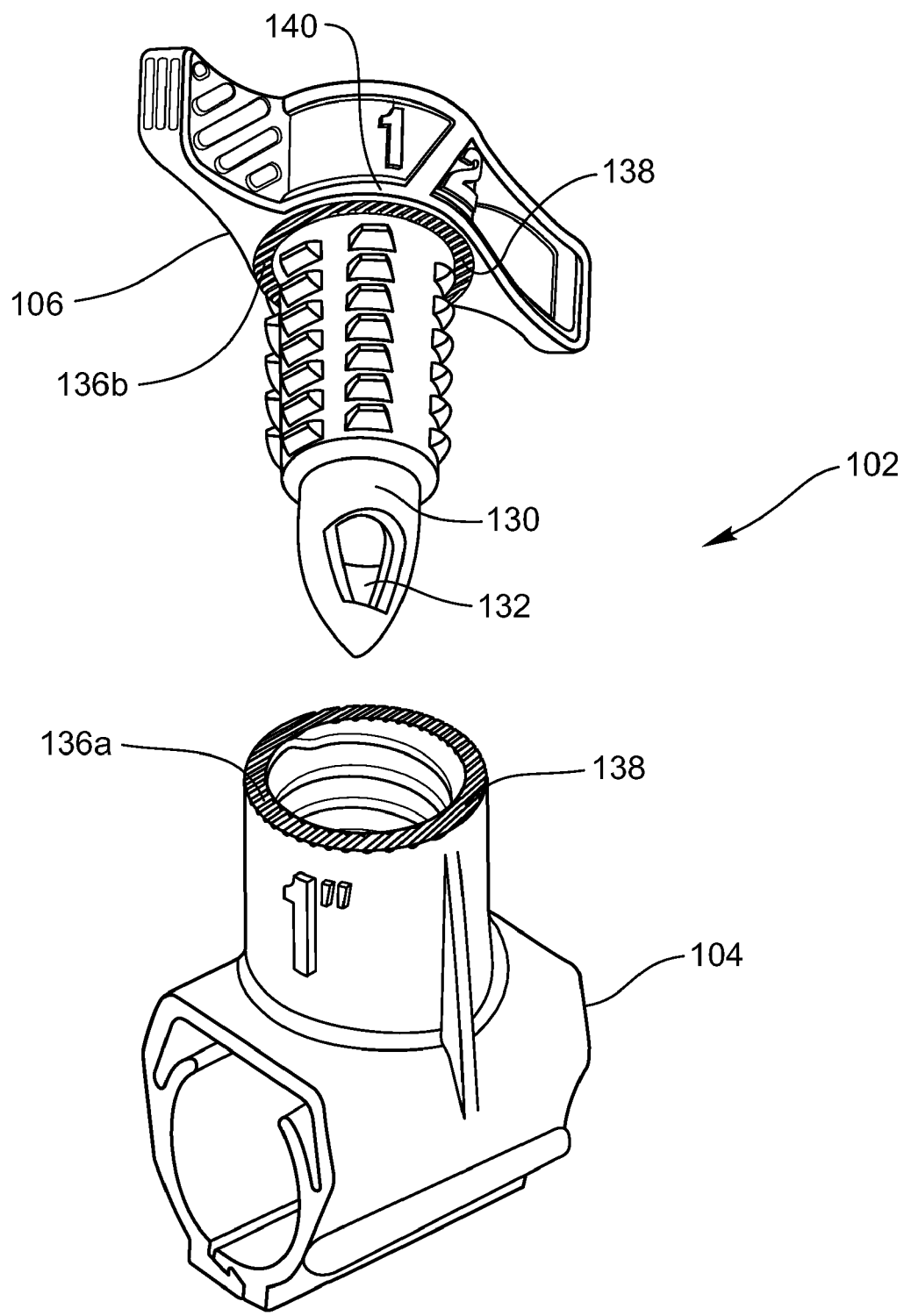
FIG. 2 is a perspective view of an embodiment of a saddle tee and a tap, illustrating a first interface surface shown on a base unit and a second mating interface surface on a tap.

With reference to FIG. 2, in one embodiment, the saddle tee 102, the tap 106, and base unit 104 may include mating interface surfaces 136a-b. Each interface surface 136a-b includes a series of linearly aligned ridges 138. These 138 ridges mate when the tap 106 is fully inserted into the base unit 104. A first interface surface 136a is positioned on the base unit 104, while the second interface surface 136b is positioned on a shoulder 140 of the tap 106.

When the second interface surface 136b aligns and seats on the first interface surface 136a, a threshold level of torque is required to unseat and rotate the tap 106 relative to the base unit 104. The first interface surface 136a aligns and seats on the second interface surface 136b to limit rotation of the tap 106 relative to the base unit 104. The threshold level of torque is in excess of that which is likely to be reached without human intervention. In other words, when the first interface surface 136a is aligned and seated on the second interface surface 136b, it is unlikely that the tap 106 will inadvertently rotate out of the base unit 104 without human intervention. For example, forces created by fluid flow through the main line 110 (shown in FIG. 1) and tap 106 or forces exerted by soil on the tap 106 will generally be insufficient to unseat the tap 106 from the base unit 104.

Furthermore, the linearly aligned ridges 138 have an additional benefit. In particular, the ridges 138 indicate to a user when the tap 106 is properly seated and aligned, or, in other words, fully inserted into the base unit 104. When the second interface surface 136b of the tap 106 is properly aligned and seated on first interface surface 136a of the base unit 104, apertures 132 in the tapered end 130 of the tap 106 align with the flow within the main line 110 (shown in FIG. 1) to facilitate fluid flow through the tap 106.

It should be noted here that the linearly aligned ridges 138 may be embodied in a number of different ways. As illustrated in FIG. 2, the linearly aligned ridges 138 are solid ridges. The ridges 138 may be embodied, for example, as a series of intermittent peaks or any other type of relief feature that causes the tap 106 to align and seat with the base unit 104.

Figure 3:
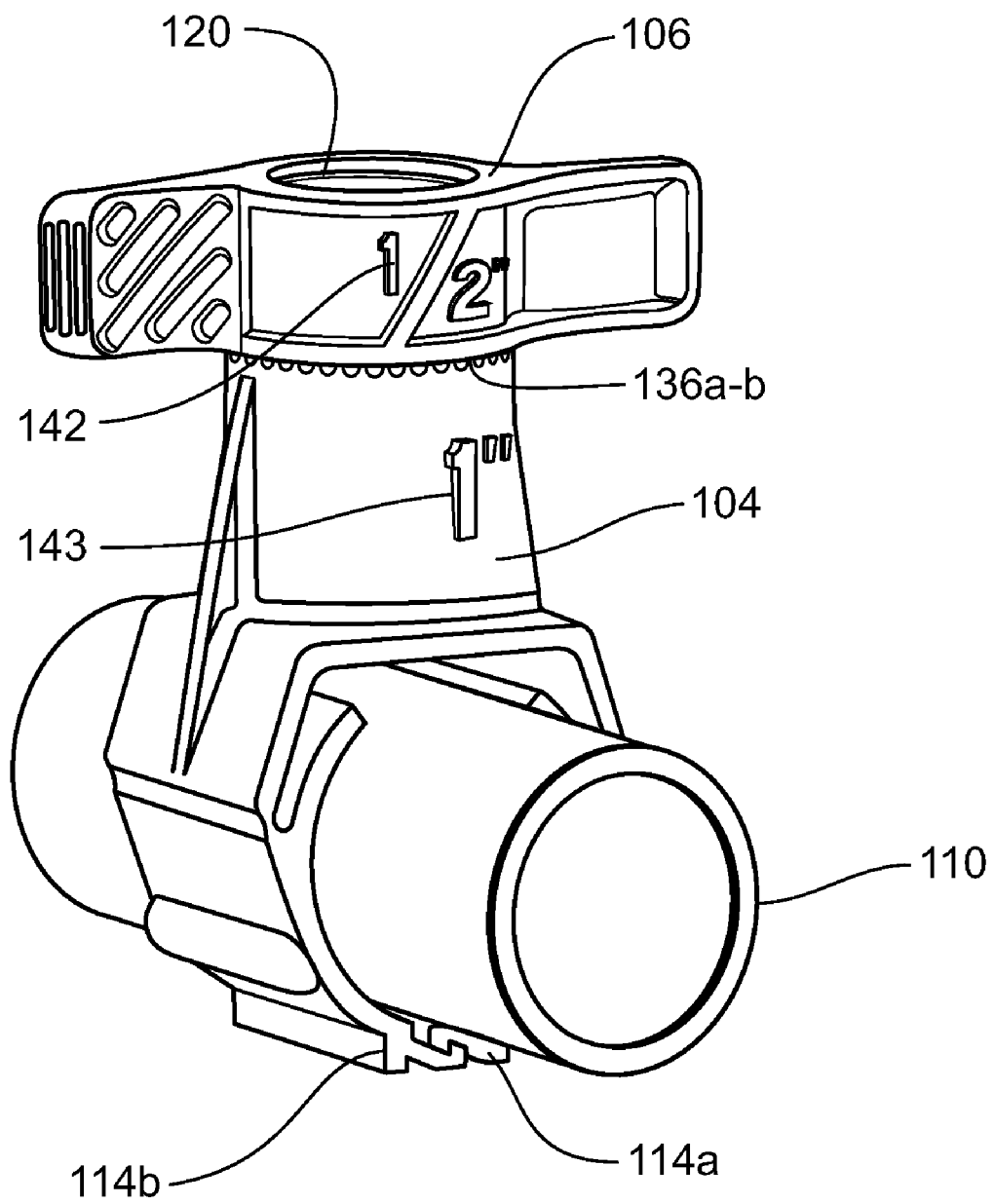
FIG. 3 illustrates an embodiment of a saddle tee having the tap fully inserted within a base unit shown with the base unit being secured to a main line.

FIG. 3 is a perspective view of a tap 106, base unit 104, and main line 110. As illustrated in FIG. 3, the tap 106 is fully inserted into the base unit 104. The interface surfaces 136a-b are shown in an aligned and seated position. Also, the arcuate interlocking jaws 114a-b are shown in a closed, or locked position, being securely fastened around the main line 110.

As shown, the tap 106 has pierced the main line 110. In other words, the tap 106 has been driven into the main line 110 and is in penetrating engagement with the main line 110. Fluid may thus pass from the main line 110 through the aperture(s) 132 (shown in FIGS. 1 and 2) and into the passageway 126 (shown in FIG. 1) of the tap 106 and vice versa. In this condition, a branching type relationship exists between the tap 106 and the main line 110.

As illustrated in FIG. 3, the size (e.g., diameter) of the conduit with which the fitting 120 of the tap 106 is capable of interfacing is shown in raised text 142 on the side of the tap 106. This raised text 142 makes it easy for a user to determine the size of conduit (e.g., a pipe or sprinkler) with which the fitting 120 of the tap 106 is capable of interfacing, even in dirty conditions. Also, the slash ("/") acts as a reinforcing rib to strengthen the design of the tap 106.

Raised text 143 is also shown on the base unit 104, making it simple for the end-user to determine the size of the main line 110 with which the base unit 104 is capable of interfacing. Furthermore, because the relevant size information is shown on the tap 106 and on the base unit 104 in raised text 142, 143, the text 142, 143 will not be worn off or easily obscured or destroyed, as a paper label or ink printing could be. In an alternative embodiment (not shown), the text is sunken or recessed into the material from which the base unit 104 or tap 106 are made.

Figure 4A:
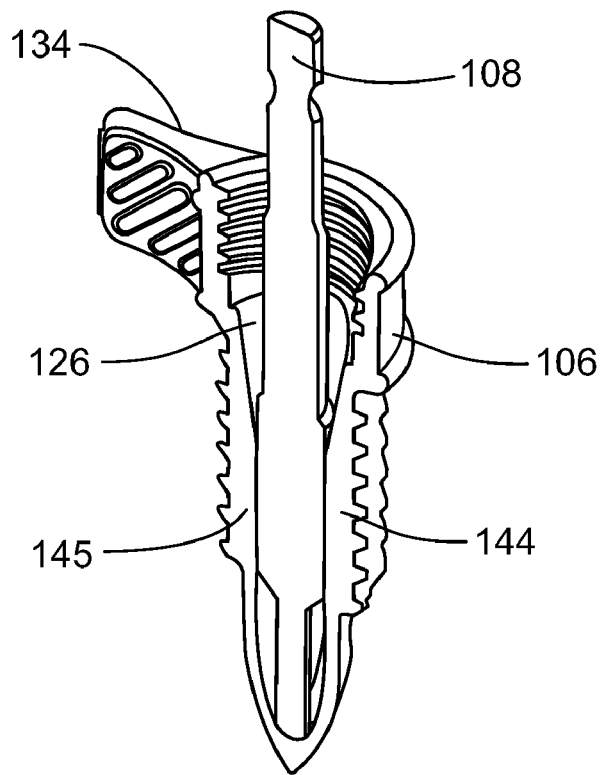
FIG. 4A is a cross-sectional view of an embodiment of a tap for a saddle tee with a interface tool disposed within a passageway of the tap.
Figure 4B:
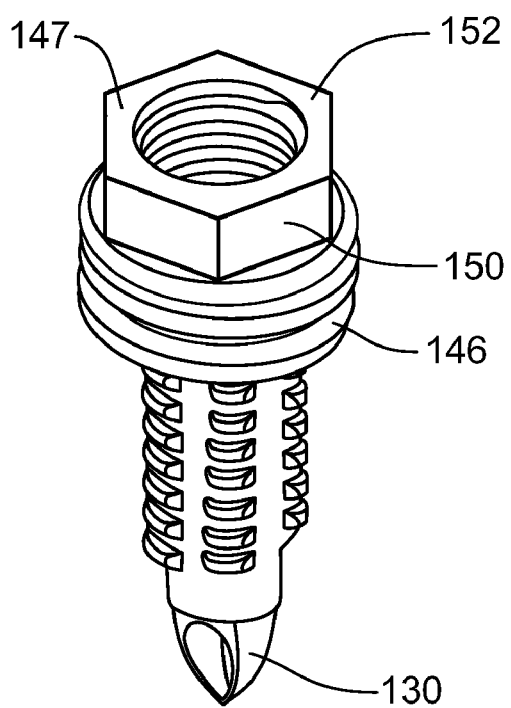
FIG. 4B is a perspective view of another embodiment of a tap for a saddle tee with a shaped protrusion for interfacing with an interface tool.

FIGS. 4A-B illustrate different embodiments of a shaped portion 144, 150 for receiving a tool interface 108. In FIG. 4A, a partial cutaway of both a tool interface 108 and a tap 106 for receiving the illustrated tool interface 108 are shown. In the embodiment shown in FIG. 4A, the shaped portion 144 comprises a throat 145 defining a portion of the passageway 126. The shaped portion 144 of the tap 106 securely receives the tool interface 108 such that rotation of the tool interface 108 will cause rotation of the tap 106.

FIG. 4A further illustrates an embodiment of the tap 106 including at least one wing 134. Of course, embodiments of the tap 106 may include a plurality of wings 134 (e.g., one, two, or four wings) or no wings 134 at all.

With reference to FIG. 4B, the illustrated tap 146 includes a first end 147 and a second, or tapered, end 130. The first end 147 includes a shaped portion 150. The shaped portion 150 shown in FIG. 4B is a shaped protrusion 152 on the first end 147 adapted to be positioned within a tool interface. In this case, the tool interface could be a socket (not shown) from a ratchet set or a specially made tool interface 108 for the shaped protrusion 152. The tool interface could also include an adaptor connecting the socket and a power tool or, alternatively, the tool interface 108 could include an integrated socket and adaptor.

The embodiment shown in FIG. 4B does not include wings 134. However, an embodiment with a shaped protrusion 152, may include a plurality of wings 134, such as two or four wings 134 located subtending the shaped protrusion 152.

With reference to both FIGS. 4A and 4B, the shaped portion 144, 150 may optionally include wings 134, as indicated above. However, the shaped portion 144, 150 (regardless of the embodiment of the shaped portion 144, 150) is separate and distinct from the wings 134, i.e., wings 134 do not comprise any part of the shaped portion 144, 150 that receives the tool interface 108.

Figure 5A:
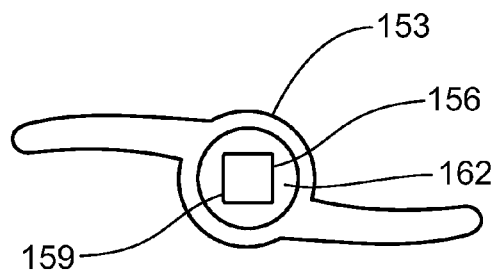
FIGS. 5A-C provide top views of the various types of shaped portions, each shaped portion comprising a throat defining a portion of the passageway.
Figure 5B:
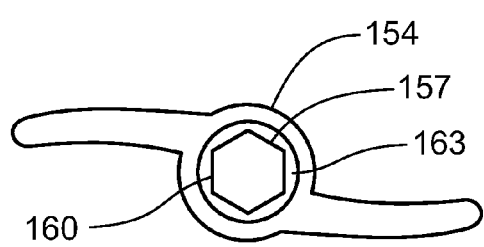
Figure 5C:
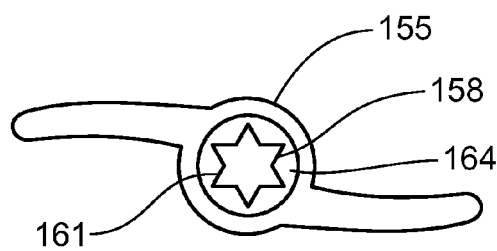

FIGS. 5A-C are top views of a tap 153, 154, 155 utilizing different types of shaped portions 156, 157, 158 comprising a throat 159, 160, 161 defining a portion of a passageway 162, 163, 164. In particular, FIG. 5A illustrates a Robertson, or square shaped throat 159; FIG. 5B illustrates a hex shaped throat 160; and FIG. 5C illustrates a torx shaped throat 161.

Of course, many different types of shaped portions, 156, 157, 158 may be utilized, such as a shaped portion 156, 157, 158 that receives a flathead or slotted, phillips, pozidriv, hex, octagonal, tri-wing, torq-set, spanner head, triple square (XZN) or a proprietary type tool.

Figure 6A:
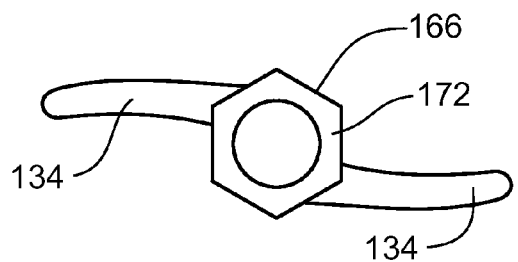
FIG. 6A-C illustrate top views of various embodiments of a shaped protrusion of a tap.
Figure 6B:
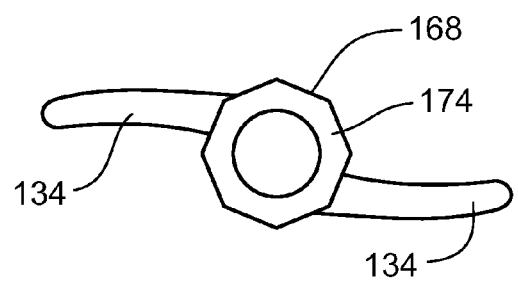
Figure 6C:
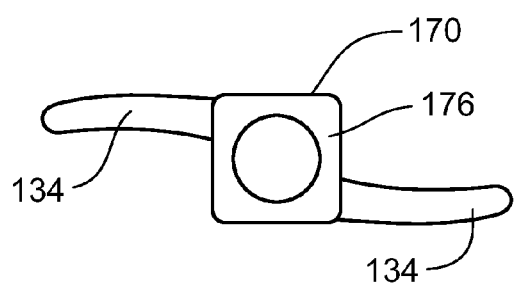

FIGS. 6A-C illustrate a number of different types of shaped portions 166, 168, 170 in the form of a shaped protrusion 172, 174, 176. In particular, FIG. 6A illustrates a hexagonal shaped protrusion 172; FIG. 6B illustrates an octagonal shaped protrusion 174; and FIG. 6C illustrates a square shaped protrusion 176. Once again, those skilled in the art will appreciate that many different types of shaped portions may be utilized to interface between an interface tool and power tool. The embodiments illustrated in FIGS. 6A-C include a pair of optional wings 134, in contrast to the embodiment shown in FIG. 4B, which has no wings 134.

FIGS. 7A-C illustrate a series of cross-sectional views of an embodiment of the base unit 104 shown with a main line 110 being positioned within the receiving cavity 112. In particular, FIG. 7A illustrates the arcuate interlocking jaws 114a-b in an open state; FIG. 7B illustrates the arcuate interlocking jaws 114a-b in an intermediate state; and FIG. 7C illustrates the arcuate interlocking jaws 114a-b in a closed, or locked, state.

Each of these figures illustrates the body 177 of the base unit 104, legs 178a-b of the base unit 104, and a first and second arcuate interlocking jaw 114a-b. The first arcuate interlocking jaw 114a includes a first contact end 180, a first contact surface 182 proximate the first contact end 180, a first interlocking end 184, and first pivot 186 disposed between the first contact end 180 and the first interlocking end 184 where the first leg 178a meets the first arcuate interlocking jaw 114a. The second arcuate interlocking jaw 114b similarly includes a second contact end 188, a second contact surface 190 proximate the second contact end 188, a second interlocking end 192, and second pivot 194 disposed between the second contact end 188 and the second interlocking end 192 where the second leg 178b meets the second interlocking jaw 114b. A receiving cavity 112 is defined by the first and second interlocking arcuate jaws 114a-b.

With reference to FIG. 7A, which shows the jaws 114a-b in an open state, the main line 110 has not been introduced into the receiving cavity 112. In this state, the first contact surface 182 is more remote from the base unit 104 than a second contact surface 190, i.e., a distance 198 between the body 177 of the base unit 104 and the first contact surface 182 is greater than the distance 200 between the body 177 of the base unit 104 and the second contact surface 190. This offset orientation of the first and second contact surfaces 182, 190 significantly facilitates the use of the saddle tee 102, as will be explained below.

FIG. 7B shows the intermediate state of the interlocking jaws 114a-b. When the main line 110 is introduced into the receiving cavity 112, the main line 110 will impact the first contact surface 182 before impacting the second contact surface 190. This causes the first arcuate interlocking jaw 114a to rotate and position about the main line 110 before the second arcuate interlocking jaw 114b moves into position about the main line 110, as shown in FIG. 7B.

With respect to FIG. 7C, the first and second interlocking jaws 114a-b are shown in a closed, or locked, state. As the main line 110 is positioned further within the receiving cavity 112, the second arcuate interlocking jaw 114b moves into position about the main line 110. The first and second interlocking ends 184, 192 contact and are interlocked. The first interlocking end 184 is positioned first and proximate the main line 110 and then the second interlocking end 192 moves into abutting engagement with a remote surface 201 of the first interlocking end 184 causing the first and second interlocking ends 184, 192 to interlock. If the second interlocking end 192 positions adjacent the main line 110 first, the interlocking ends 184, 192 will not interlock, forcing the user to manually manipulate or alter the interlocking jaws 114a-b in order to lock the base unit 104 around the main line 110.

The offset configuration of the contact surfaces 182, 190 of the arcuate interlocking jaws 114a-b significantly facilitates and enhances the operation of the base unit 104. For example, a user could install the base unit 104 on a main line 110 where there is little or no space cleared around the main line 110. By pushing the base unit 104 onto the main line 110, the first and second interlocking ends 114a-b will move in the desired sequence and be properly positioned to enable them to interlock without manual adjustment. This configuration saves significant time, for example, because the user does not need to clear out the dirt, or much dirt, around the main line 110, significantly decreasing the installation time of the base unit 104.

Further, the first and second arcuate interlocking jaws 114a-b are shaped to compress and to deform the main line 110 into a generally elliptical shape 202 when the first and second arcuate interlocking jaws 114a-b are in a locked state. Placing the main line 110 in this configuration readies the proximate portion 204 of the main line 110 for piercing by the tap 106, similar to how a taut piece of fabric can more easily be pierced than a slack piece of fabric.

Figure 8:
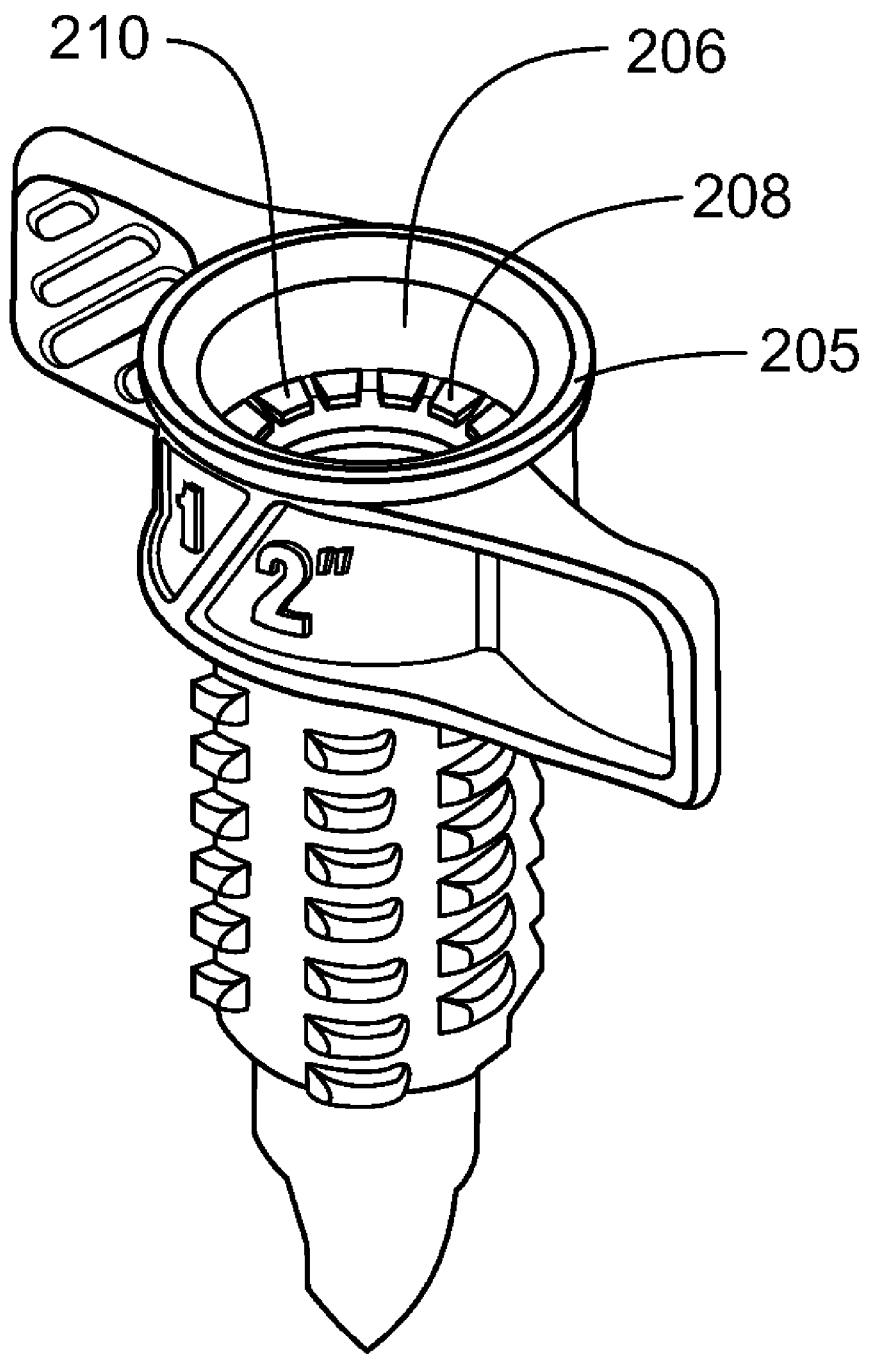
FIG. 8 illustrates one embodiment of a tap for a saddle tee including a fitting for securing a conduit to the tap without the use of tools.

FIG. 8 illustrates one embodiment of the tap 205. In particular, the tap 205 illustrated in FIG. 8 includes a non-threaded type of fitting 206 for coupling the tap 205 to a conduit (not shown), such as a sprinkler, or pipe without the use of tools.

The embodiment of FIG. 8 illustrates a fitting 206 which may be secured to a conduit that has a smooth outer surface without annular grooves, annular flanges, or annular beads, all without the use of tools or adhesives. The illustrated fitting 206 includes a gripping mechanism 208, such as the teeth 210 illustrated in FIG. 8, to grasp the end of the conduit and secure the conduit (not shown) within the fitting 206. Other embodiments of this type of fitting 206 may be utilized, such as those disclosed in U.S. Pat. No. 7,021,672 to Ericksen et. al., entitled Irrigation Coupling Apparatus and Method, which is herein incorporated by this reference.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A saddle tee for use in branching a conduit from a main line using a tool interface, the saddle tee comprising:
   a base unit defining an opening for receiving a tap, said base unit comprising interlocking jaws for securing the base unit to the main line, said base unit further comprising:
   a body;
   a first arcuate interlocking jaw comprising a first contact end, a first contact surface proximate the first end, a first interlocking end, and a first pivot disposed between the first contact end and the first interlocking end;
   a second arcuate interlocking jaw comprising a second contact end, a second contact surface proximate the second contact end, a second interlocking end, and a second pivot disposed between the second contact end and the second interlocking end; and
   in an open state, the first and second arcuate interlocking jaws defining a receiving cavity for receiving the main line, the first contact surface being positioned more remote from the body of the base unit than the second contact surface; and
   a tap defining a passageway, the tap comprising:
   a tapered end having an aperture in fluid communication with the passageway;
   a fitting opposite the tapered end; and
   a shaped portion for receiving the tool interface for rotating the tap to drive the tap into penetrating engagement with the main line, the shaped portion being separate and distinct from any wing that may be present on the tap.

2. The saddle tee of claim 1, wherein the tap further comprises at least one wing.

3. The saddle tee of claim 1, wherein the shaped portion comprises a throat defining a portion of the passageway.

4. The saddle tee of claim 1, wherein the tap comprises a first end generally opposite the tapered end, the shaped portion comprising a shaped protrusion on the first end adapted to be positioned within the tool interface.

5. The saddle tee of claim 4, wherein the first and second arcuate jaws are shaped to deform the main line into a generally elliptical cross-sectional shape when the first and second arcuate jaws are positioned about the main line in a locked state.

6. The saddle tee of claim 1, wherein the base unit further comprises a first interface surface having a series of linearly aligned ridges, and wherein the tap further comprises a shoulder having a second interface surface that aligns and seats on the first interface surface to limit rotation of the tap relative to the base unit when the tap is fully inserted into the base unit.

7. The saddle tee of claim 1, wherein the fitting comprises a gripping mechanism that grasps an end of a conduit without annular grooves, annular flanges, or annular beads to secure the end of the conduit within the fitting.

8. The saddle tee of claim 1, wherein the base unit further comprises raised text identifying a size of the main line with which the base is capable of interfacing.

9. The saddle tee of claim 1, wherein the tap further comprises raised text identifying a size of the conduit with which the tap is capable of interfacing, the raised text further comprising a reinforcement rib.

10. A saddle tee for use in branching a conduit from a main line, the saddle tee comprising:
a base unit having a body defining an opening for receiving a tap and further comprising:
a first arcuate interlocking jaw comprising a first contact end, a first contact surface proximate the first contact end, a first interlocking end, and a first pivot disposed between the first contact end and the first interlocking end;
a second arcuate interlocking jaw comprising a second contact end, a second contact surface proximate the second contact end, a second interlocking end, and a second pivot disposed between the second contact end and the second interlocking end; and
in an open state, the first and second arcuate interlocking jaws defining a receiving cavity for receiving the main line, the first contact surface being positioned more remote from the body of the base unit than the second contact surface; and
a tap defining a passageway, the tap comprising a tapered end having an aperture in fluid communication with the passageway.

11. The saddle tee of claim 10, wherein as the first and second arcuate interlocking jaws are moveable between an open state and a locked state in response to positioning the main line within the receiving cavity, the first interlocking end is positioned closer to the main line than the second interlocking end to enable the first and second interlocking ends to properly mate without manually adjusting the first and second interlocking ends.

12. The saddle tee of claim 10, wherein as the main line is partially positioned within the receiving cavity, the first arcuate interlocking jaw pivots to position about the main line before the second arcuate interlocking jaw pivots to position about the main line in response to the main line contacting the first contact surface before the main line contacts the second contact surface.

13. The saddle tee of claim 10, wherein when a main line is fully positioned within the receiving cavity, the first arcuate interlocking jaw and second arcuate interlocking jaw are positioned about the main line, the first and second interlocking ends being in a locked state with the first interlocking end being positioned closer to the main line than the second interlocking end without manually adjusting the first and second interlocking ends.

14. The saddle tee of claim 10, wherein the first and second arcuate jaws are shaped to deform the main line into a generally elliptical shape when the first and second arcuate jaws are in a locked state.

15. The saddle tee of claim 10, wherein the body defines female threads surrounding the opening for interfacing with male threads on the tap.

16. The saddle tee of claim 10, wherein the tap comprises a fitting with a gripping mechanism that grasps an end of a conduit without annular grooves, annular flanges, or annular beads to secure the end of the conduit within the fitting.

17. The saddle tee of claim 10, wherein the tap comprises a fitting with female threads for receiving a conduit.

18. A saddle tee for use in branching a conduit from a main line, the saddle tee comprising:
a base unit defining an opening for receiving a tap, the base unit comprising a first interface surface having a series of linearly aligned ridges and further comprising interlocking jaws for securing the base unit to the main line; and
a tap defining a passageway, the tap comprising:
a first end having a shoulder including a second interface surface that aligns and seats on the first interface surface to limit rotation of the tap relative to the base unit when the tap is fully inserted into the base unit such that a threshold level of torque is required to rotate the tap relative to the base unit, the threshold level of torque being in excess of that which is likely to be reached without human intervention; and
a tapered end having an aperture in fluid communication with the passageway.

19. The saddle tee of claim 18, wherein at least one of either the first interface surface and the second interface surface comprises a series of intermittent peaks.

20. The saddle tee of claim 18, wherein the tap comprises a fitting with a gripping mechanism that grasps an end of a conduit without annular grooves, annular flanges, or annular beads to secure the end of the conduit within the fitting.

* * * * *